(12) United States Patent  
Liao (10) Patent No.: US 9,148,179 B2  
(45) Date of Patent: Sep. 29, 2015

(54) RF PROCESSING CIRCUIT AND WIRELESS COMMUNICATION DEVICE USING THE SAME

(75) Inventor: Shen-Yi Liao, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 226 days.

(21) Appl. No.: 13/437,947

(22) Filed: Apr. 3, 2012

(65) Prior Publication Data

US 2012/0309332 A1  Dec. 6, 2012

(30) Foreign Application Priority Data

May 30, 2011 (TW) .............................. 100118913 A (51) Int. Cl.  
H04B 7/00 (2006.01)  
H04B 1/38 (2006.01)  
H04M 1/00 (2006.01)  
H04B 1/00 (2006.01)  
H04B 1/401 (2015.01)

(52) U.S. Cl.  
CPC ................ *H04B 1/005* (2013.01); *H04B 1/401* (2013.01)

(58) Field of Classification Search  
CPC .................................................... H04B 7/0602  
USPC ........................................................ 455/560  
See application file for complete search history.

(56) References Cited

U.S. PATENT DOCUMENTS

| 7,190,974 | B2 * | 3/2007 | Efland et al. ................ 455/562.1 |
| 7,636,560 | B2 * | 12/2009 | Ku ................................ 455/272 |
| 7,701,410 | B2 * | 4/2010 | Li et al. ......................... 343/876 |
| 7,751,850 | B2 * | 7/2010 | Karaoguz ..................... 455/553.1 |
| 7,902,960 | B2 * | 3/2011 | Tsuchimochi et al. ....... 340/5.71 |
| 8,369,811 | B2 * | 2/2013 | Sultenfuss et al. ............ 455/272 |
| 2004/0198420 | A1 | 10/2004 | He |
| 2009/0262042 | A1 * | 10/2009 | Li et al. ......................... 343/876 |
| 2013/0162495 | A1 * | 6/2013 | Kwon et al. ................... 343/852 |

* cited by examiner

Primary Examiner — Tilahun B Gesesse  
(74) Attorney, Agent, or Firm — Winston Hsu; Scott Margo (57) ABSTRACT

A radio-frequency (RF) processing circuit used in a wireless communication device is disclosed. The RF processing circuit comprises an RF front-end circuit, coupled to a first antenna, a second antenna, a first wireless communication module and a second wireless communication module, for switching couplings between the first antenna and the second antenna, and the first wireless communication module and the second wireless communication module according to a control signal; and a control unit, for generating the control signal to the RF front-end circuit according to operation frequency bands and operation conditions of the first wireless communication module and the second wireless communication module.

24 Claims, 4 Drawing Sheets

RF PROCESSING CIRCUIT AND WIRELESS COMMUNICATION DEVICE USING THE SAME

BACKGROUND OF THE INVENTION

1. Field of the Invention

The present invention relates to a radio-frequency (RF) processing circuit and a wireless communication device, and more particularly, to an RF processing circuit and a wireless communication device for supporting multiple-input multiple-output (MIMO) technique and adjusting transmissions of signals according to channel conditions.

2. Description of the Prior Art

With the advancement of wireless communication, different wireless communication systems have been developed, such as mobile communication system, wireless local area network (WLAN) and wireless personal area network (WPAN). For example, the mobile communication system can be Global System for Mobile Communications (GSM), 3rd generation (3G) or long term evolution (LTE), the WLAN can be Wi-Fi or Worldwide Interoperability for Microwave Access (WiMAX), and the WPAN can be Bluetooth. Preferably, different wireless communication systems operate on different operation frequency bands and use different communication technologies (e.g. modulation, coding and/or ciphering), to avoid mutual interference between wireless signals of different wireless communication systems. However, some of the wireless communication systems must operate on the same operation frequency band due to limited spectrum resources.

For example, operation frequency bands of Bluetooth (e.g. IEEE 802.15.1) and Wi-Fi (e.g. IEEE 802.11) are on the industrial, scientific medical (ISM) band located around a carrier frequency of 2.4 GHz, and the ISM band is reserved internationally for industrial, scientific and medical applications. Therefore, there may be a wireless communication device using Bluetooth and Wi-Fi on the same operation frequency band at the same time. In this situation, when a wireless signal of Bluetooth or Wi-Fi is transmitted and received via an antenna, a wireless signal of the other must stop transmitting and receiving via the same antenna even though different protocols with different modulations and codings are respectively used for Bluetooth and Wi-Fi. In other words, transmission or reception of the wireless signal of Bluetooth or Wi-Fi occupies the antenna.

On the other hand, multi-input multi-output (MIMO) technique has been used to increases a data rate of wireless signals. That is, multiple antennas are used in a transceiver to transmit/receive a wireless signal for providing a signal processing gain, to improve quality of a corresponding received wireless signal. Therefore, the received wireless signal is highly possible to be recovered correctly, and the data rate of the wireless signals can be increased. However, when a wireless communication device is equipped with multiple antennas (e.g. two antennas), and must process the wireless signals of Bluetooth and Wi-Fi at the same time, the two antennas are respectively used for processing the wireless signals of Bluetooth and Wi-Fi. In other words, each of Bluetooth and Wi-Fi can only occupies one of the two antennas, and cannot utilize MIMO technique. Therefore, when a wireless communication device must process the wireless signals of Bluetooth and Wi-Fi at the same time, MIMO technique can not be enabled to increase the data rate of the wireless signals.

The above situations are frequently happened to a computer system including a wireless communication device with MIMO technique. For example, a user uses the computer system to surf the Internet via Wi-Fi, and uses a headphone, a keyboard or a mouse via Bluetooth at the same time. Please note that, the above situations are illustrated by using Bluetooth and Wi-Fi which are frequently installed in a same electronic device, such as a notebook, a mobile phone, etc. The user is highly possible to use Bluetooth and Wi-Fi at the same time such that MIMO technique cannot be enabled and the data rate of the wireless signals can not be increased. However, the same problem also exists to other wireless communication systems operating on the same operation frequency band.

Besides, according to contents included in wireless signals or a user input, the priorities of the wireless signals are typically different. For example, transmissions of voice or data in a wireless communication system can only begin after a control message is correctly received and recovered. Therefore, a priority of a wireless signal including the control message is usually higher than that of other wireless signals. Further, an amount of resources for correctly receiving and recovering the control message is usually large due to the instability of a wireless channel, wherein most part of the resources are wasted for retransmitting the control message.

Therefore, how to utilize MIMO technique for increasing the data rate of the wireless signals, and increasing a probability of correctly recovering the wireless signal with the higher priority are topics to be discussed and addressed.

SUMMARY OF THE INVENTION

The present invention therefore provides a radio-frequency (RF) processing circuit and a wireless communication device to solve the abovementioned problems.

A radio-frequency (RF) processing circuit used in a wireless communication device is disclosed. The RF processing circuit comprises an RF front-end circuit, coupled to a first antenna, a second antenna, a first wireless communication module and a second wireless communication module, for switching couplings between the first antenna and the second antenna, and the first wireless communication module and the second wireless communication module according to a control signal; and a control unit, for generating the control signal to the RF front-end circuit according to operation frequency bands and operation conditions of the first wireless communication module and the second wireless communication module; wherein the first wireless communication module is coupled to the first antenna and the second wireless communication module is coupled to the first antenna and the second antenna according to the control signal generated by the control unit, when the operation frequency bands of the first wireless communication module and the second wireless communication module are different, or when the first wireless communication module stops operation.

A wireless communication device comprising a first antenna, a second antenna, a first wireless communication module, a second wireless communication module, and a radio-frequency (RF) processing circuit is disclosed. The RF processing circuit comprises an RF front-end circuit, coupled to the first antenna, the second antenna, the first wireless communication module and the second wireless communication module, for switching couplings between the first antenna and the second antenna, and the first wireless communication module and the second wireless communication module according to a control signal; and a control unit, for generating the control signal to the RF front-end circuit according to operation frequency bands and operation conditions of the first wireless communication module and the second wireless communication module; wherein the first wireless communication module is coupled to the first antenna and the second wireless communication module is coupled to the first antenna and the second antenna according to the control signal generated by the control unit, when the operation frequency bands of the first wireless communication module and the second wireless communication module are different, or when the first wireless communication module stops operation.

These and other objectives of the present invention will no doubt become obvious to those of ordinary skill in the art after reading the following detailed description of the preferred embodiment that is illustrated in the various figures and drawings.

DETAILED DESCRIPTION

The present invention adjusts couplings between wireless communication modules and antennas according to operation frequency bands and operation conditions of the wireless communication modules, to avoid mutual interference between wireless signals transmitted and received on the same or closed operation frequency bands. Further, the present invention supports a multi-input multi-output (MIMO) technique for increasing a data rate of the wireless signals.

In general, there are many kinds of wireless communication systems operating on the same or the closed operation frequency bands. An electronic device equipped with two wireless communication modules is illustrated in the following examples to clearly illustrate the present invention. Please note that, the number of the wireless communication modules is not limited to two, and the present invention applies to any electronic device equipped with two or more wireless communication modules operating on the same or the closed operation frequency bands.

Figure 1:
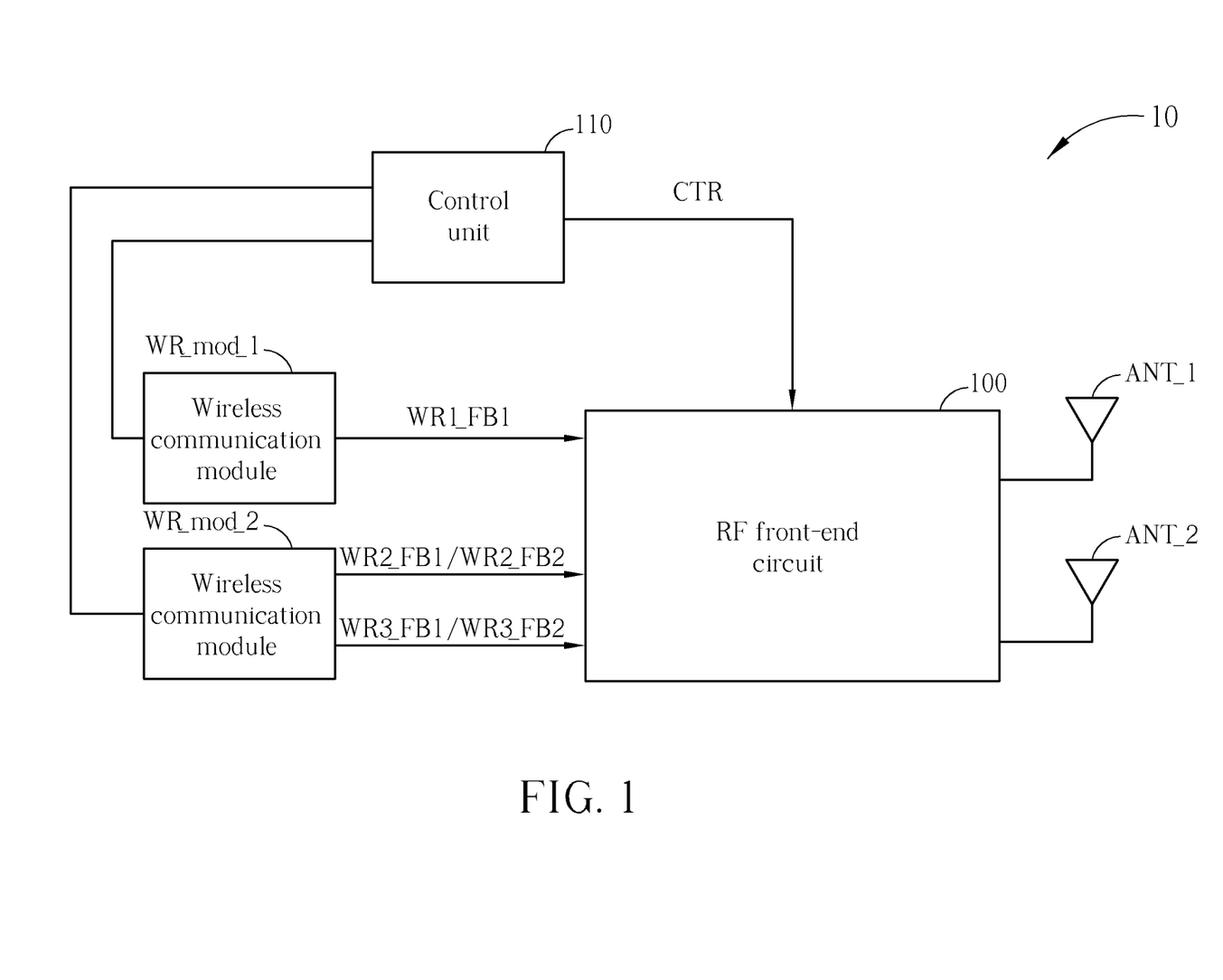
FIG. 1 is a schematic diagram of a wireless communication device according an embodiment of the present invention.

Please refer to FIG. 1, which is a schematic diagram of a wireless communication device 10 according to an embodiment of the present invention. The wireless communication device 10 is used in an electronic device such as a computer system, a mobile device, etc, and includes a wireless communication module WR_mod_1, a wireless communication module WR_mod_2, a radio-frequency (RF) front-end circuit 100, an antenna ANT_1, an antenna ANT_2 and a control unit 110. The wireless communication module WR_mod_1 transmits and receives a wireless signal WR1_FB1 via the antenna ANT_1. The wireless communication module WR_mod_2 supports the MIMO technique, and can transmit and receive wireless signals WR2_FB1 and WR3_FB1 via the antennas ANT_1 and ANT_2, respectively. Alternatively, the wireless communication module WR_mod_2 can transmit and receive wireless signals WR2_FB2 and WR3_FB2 via the antennas ANT_1 and ANT_2, respectively. Please note that, the wireless signals WR1_FB1, WR2_FB1 and WR3_FB1 are transmitted and received on an operation frequency band FB1, and the wireless signals WR2_FB2 and WR3_FB2 are transmitted and received on an operation frequency band FB2. The wireless communication module WR_mod_2 only transmits and receives wireless signals on one of the operation frequency bands at the same time, e.g. the wireless signals WR2_FB1 and WR3_FB1 or the wireless signals WR2_FB2 and WR3_FB2.

The control unit 110 generates a control signal CTR to the RF front-end circuit 100 to adjust couplings between the wireless communication modules WR_mod_1 and WR_mod_2, and the antennas ANT_1 and ANT_2 according to operation frequency bands and operation conditions of the wireless communication modules WR_mod_1 and WR_mod_2. In other words, the RF front-end circuit 100 and the control unit 110 can be integrated as a RF processing circuit to realize the present invention. In detail, the control unit 110 generates the control signal CTR to the RF front-end circuit 100 for controlling the wireless communication module WR_mod_2 to increase a data rate of wireless signals by using the MIMO technique, according to whether the operation frequency bands used by the wireless communication modules WR_mod_1 and WR_mod_2 are the same and whether the wireless communication module WR_mod_1 operates. In other words, when the operation frequency bands used by the wireless communication modules WR_mod_1 and WR_mod_2 are different, i.e., the wireless communication module WR_mod_1 transmits and receives the wireless signal WR1_FB1 and the wireless communication module WR_mod_2 transmits and receives the wireless signals WR2_FB2 and WR3_FB2, the control unit 110 controls the RF front-end circuit 100 to couple the wireless communication module WR_mod_1 to the antenna ANT_1, and couple the wireless communication module WR_mod_2 to the antennas ANT_1 and ANT_2. In this situation, the wireless communication module WR_mod_1 transmits and receives the wireless signal WR1_FB1 via the antenna ANT_1, and the wireless communication module WR_mod_2 uses the MIMO technique to transmit and receive the wireless signals WR2_FB2 and WR3_FB2 via the antennas ANT_1 and ANT_2. Besides, when the wireless communication module WR_mod_1 does not operate, the control unit 110 controls the RF front-end circuit 100 to couple the wireless communication module WR_mod_2 to the antennas ANT_1 and ANT_2 whichever the operation frequency band of the wireless communication module WR_mod_2 is. As a result, the wireless communication module WR_mod_2 can use the MIMO technique to transmit and receive the wireless signals WR2_FB1 and WR3_FB1, or the wireless signals WR2_FB2 and WR3_FB2 via the antennas ANT_1 and ANT_2.

As can be seen from the above, when the operation frequency bands used by the wireless communication modules WR_mod_1 and WR_mod_2 are different, the wireless communication module WR_mod_2 can use the MIMO technique to transmit and receive the wireless signals in a high data rate. Otherwise, when the operation frequency bands used by the wireless communication modules WR_mod_1 and WR_mod_2 are the same or closed, the wireless communication modules WR_mod_1 and WR_mod_2 transmit and receive the wireless signals via different antennas, e.g., the wireless communication modules WR_mod_1 and WR_mod_2 uses the antennas ANT_1 and the ANT_2, respectively.

Please note that, the spirit of the wireless communication device 10 is to utilize the RF front-end circuit 100 and the control unit 110 such that the wireless communication module WR_mod_2 can use the MIMO technique, when the operation frequency bands used by the wireless communication modules WR_mod_1 and WR_mod_2 are different or the wireless communication module WR_mod_1 does not operate. An embodiment of the wireless communication device 10 is not limited, as long as the above illustration can be achieved. For example, please refer to FIG. 2, which is a schematic diagram of an RF front-end circuit 20 according to an embodiment of the present invention, to realize the RF front-end circuit 100 shown in FIG. 1. The RF front-end circuit 20 includes a switch 202, a diplexer 204 and an interface 206. The switch 202 is used for adjusting couplings between terminals P1 and P2, and terminals P3 and P4 according to the control signal CTR, to provide correct transmission paths for wireless signals. The diplexer 204 includes three signal terminals: S1, S2 and S3. The signal terminals S1 and S2 are coupled to the terminals P3 and P4 of the switch 202, respectively. The signal terminal S3 is coupled to the antenna ANT_1. The diplexer 204 is used for combining wireless signals on different operation frequency bands received respectively at the signal terminals S1 and S2, and transferring a combined wireless signal to the signal terminal S3 to be transmitted via the antenna ANT_1. Alternatively, the diplexer 204 is used for separating the combined wireless signal received at the signal terminal S3 via the antenna ANT_1 into the wireless signals on the different operation frequency bands, and transferring respectively the wireless signals on the different operation frequency bands to the signal terminals S1 and S2.

Figure 2:
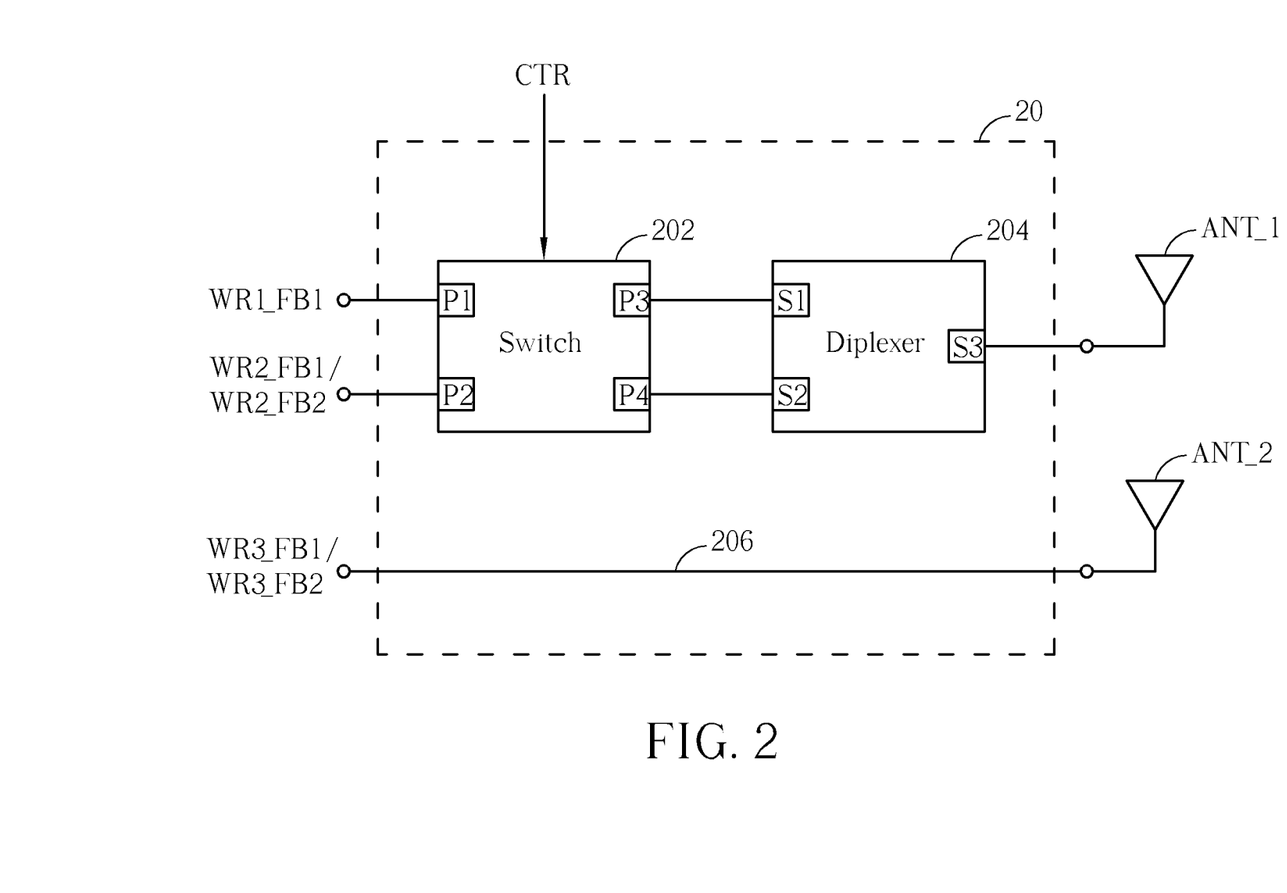
FIG. 2 is a schematic diagram of an embodiment of the RF front-end circuit shown in FIG. 1.

In detail, the terminal P1 is coupled to the wireless communication module WR_mod_1 for transferring the wireless signal WR1_FB1, and the terminal P2 is coupled to the wireless communication module WR_mod_2 for transferring the wireless signal WR2_FB1 or WR2_FB2. Preferably, the switch 202 is realized by a dual-pole dual-throw (DPDT) switch which has an advantage of providing two low-complexity couplings: a parallel coupling and a cross coupling. The parallel coupling connects the terminals P1 and P2 to the terminals P3 and P4, respectively. On the other hand, the cross coupling connects the terminals P1 and P2 to the terminals P4 and P3, respectively. Therefore, the control unit 110 only needs to generate two kinds of the control signal CTR to control the switch 202, and complexity of the RF front-end circuit 20 is reduced. When the switch 202 is realized by the DPDT switch, the wireless signals on the operation frequency bands FB1 and FB2 received at the signal terminals S1 and S2, respectively, can be combined into a combined signal which is then outputted from the signal terminal S3 to the antenna ANT_1. Alternatively, the combined signal received at the signal terminal S3 via the antenna ANT_1 can be separated into the wireless signals on the operation frequency bands FB1 and FB2 which are transferred to the signal terminals S1 and S2, and outputted to the switch 202. The interface 206 is coupled between the wireless communication module WR_mod_2 and the antenna ANT_2, for providing a transmission path for wireless signals, e.g., the wireless signal WR3_FB1 and WR3_FB2. Therefore, when the wireless communication module WR_mod_2 transmits and receives the wireless signals WR3_FB1 and WR3_FB2 on the interface 206, the wireless communication module WR_mod_2 is not affected by an operation of the wireless communication module WR_mod_1.

For example, when the operation frequency bands used by the wireless communication modules WR_mod_1 and WR_mod_2 are different, i.e., the wireless communication module WR_mod_1 transmits and receives the wireless signal WR1_FB1 on the operation frequency band FB1 and the wireless communication module WR_mod_2 transmits and receives the wireless signals WR2_FB2 and WR3_FB2 on the frequency band FB2, the switch 202 connects the terminals P1 and P2 to the terminals P3 and P4, respectively (i.e., the parallel coupling), according to the control signal CTR. In other words, the wireless communication module WR_mod_1 can use the antenna ANT_1 to transmit and receive the wireless signal WR1_FB1 via a transmission path formed by the terminals P1 and P3, and the signal terminals S1 and S3. On the other hand, the wireless communication module WR_mod_2 can use the antenna ANT_2 to transmit and receive the wireless signal WR3_FB2 via the interface 206, besides the wireless communication module WR_mod_2 can use the antenna ANT_1 to transmit and receive the wireless signal WR2_FB2 via a transmission path formed by the terminals P2 and P4, and the signal terminals S2 and S3. Therefore, the wireless communication module WR_mod_2 can use the MIMO technique to transmit and receive the wireless signals WR2_FB2 and WR3_FB2.

Besides, when the operation frequency bands used by the wireless communication modules WR_mod_1 and WR_mod_2 are the same (i.e., the frequency band FB1) and the wireless communication module WR_mod_1 stops operation, i.e., the RF front-end circuit 20 only needs to process the wireless signals WR2_FB1 and WR3_FB1 transmitted and received by the wireless communication module WR_mod_2, the switch 202 connects the terminals P1 and P2 to the terminals P4 and P3, respectively (i.e., the cross coupling), according to the control signal CTR. In this situation, the wireless communication module WR_mod_2 can use the antenna ANT_1 to transmit and receive the wireless signal WR2_FB1 via a transmission path formed by the terminals P2 and P3, and the signal terminals S1 and S3. Besides, the wireless communication module WR_mod_2 also uses the antenna ANT_2 to transmit and receive the wireless signal WR3_FB1 via the interface 206. Therefore, when the operation frequency bands used by the wireless communication modules WR_mod_1 and WR_mod_2 are the same (i.e., the frequency band FB1) and the wireless communication module WR_mod_1 stops operation, the wireless communication module WR_mod_2 can use the MIMO technique to transmit and receive the wireless signals WR2_FB1 and WR3_FB1.

On the other hand, when the operation frequency bands used by the wireless communication modules WR_mod_1 and WR_mod_2 are the same (i.e., the frequency band FB1) and the wireless communication module WR_mod_1 operates, the switch 202 connects the terminals P1 and P2 to the terminals P3 and P4, respectively (i.e., the parallel coupling), according to the control signal CTR. In this situation, the wireless communication module WR_mod_1 can use the antenna ANT_1 to transmit and receive the wireless signal WR1_FB1 via the transmission path formed by the terminals P1 and P3, and the signal terminals S1 and S3. On the other hand, the wireless communication module WR_mod_2 can not use the antenna ANT_1 to transmit and receive the wireless signal WR2_FB1 via the transmission path formed by the terminals P2 and P4, and the signal terminals S2 and S3, since the signal terminal S2 only accepts a wireless signal on the operation frequency band FB2, i.e., filter out wireless signals on other frequency bands. However, the wireless communication module WR_mod_2 still uses the antenna ANT_2 to transmit and receive the wireless signal WR3_FB1 via the interface 206. In other words, the wireless communication modules WR_mod_1 and WR_mod_2 use the antennas ANT_1 and ANT_2, respectively, to transmit and receive the wireless signals WR1_FB1 and WR3_FB1.

As can be seen from the above, when the operation frequency bands used by the wireless communication modules WR_mod_1 and WR_mod_2 are different, the wireless communication module WR_mod_2 can use the MIMO technique to transmit and receive the wireless signals in the high data rate. Besides, when the wireless communication module WR_mod_1 stops operation, the wireless communication module WR_mod_2 can use the MIMO technique regardless of the operation frequency band used by the wireless communication module WR_mod_2. On the other hand, when the operation frequency bands used by the wireless communication modules WR_mod_1 and WR_mod_2 are the same or closed and the wireless communication module WR_mod_1 operates, the wireless communication modules WR_mod_1 and WR_mod_2 transmit and receive the wireless signals via different antennas.

Furthermore, flexibility and practicality an RF front-end circuit can be increased, if channel qualities corresponding to the antennas ANT_1 and ANT_2 and priorities of the wireless signals transmitted and received by the wireless communication modules WR_mod_1 and WR_mod_2 are taken into consideration. In other words, a wireless signal with a higher priority can be transmitted and received via an antenna with a better channel quality such that antenna diversity is obtained. The wireless signal with the higher priority is highly possible to be recovered correctly.

Figure 3:
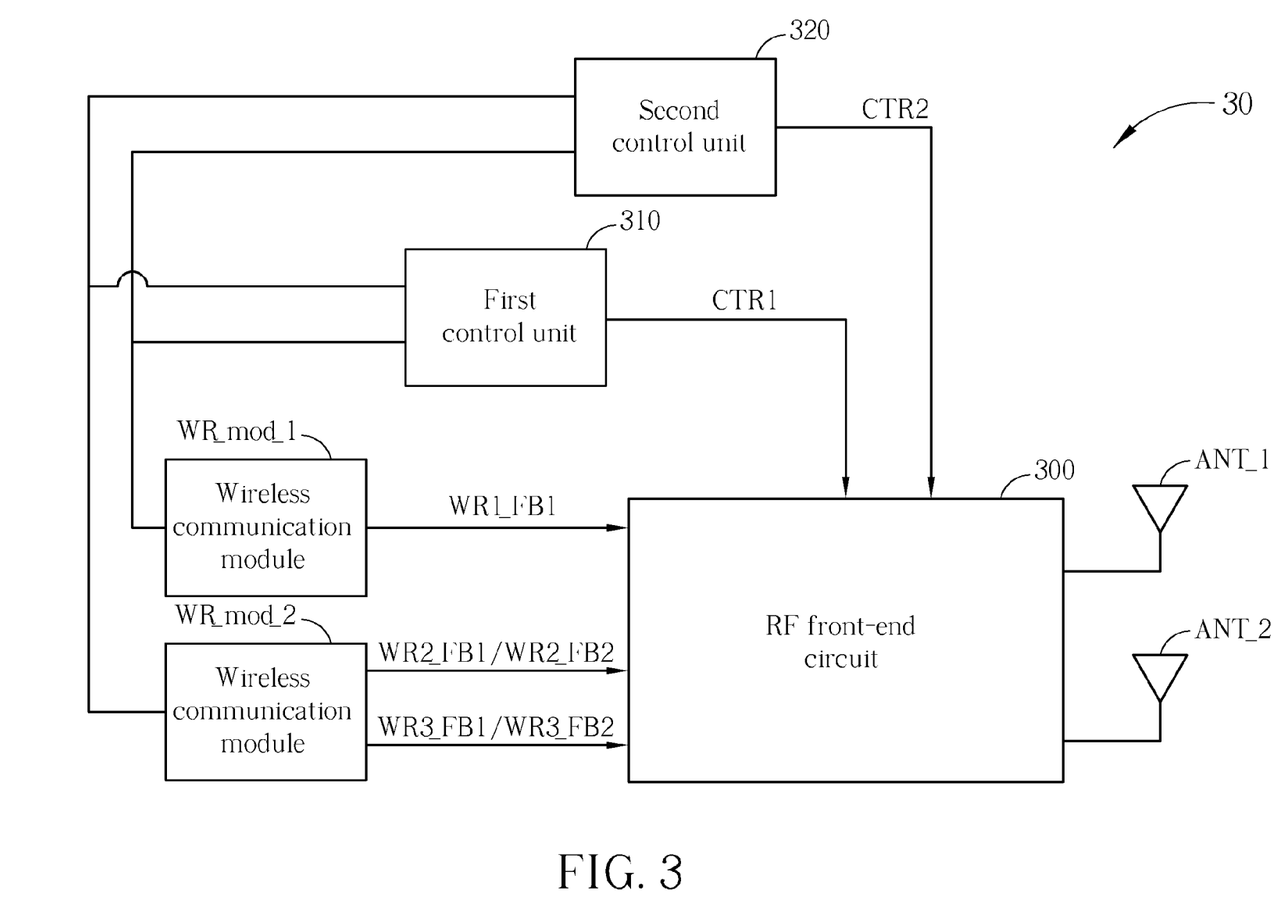
FIG. 3 is a schematic diagram of a wireless communication device according an embodiment of the present invention.

Please refer to FIG. 3, which is a schematic diagram of a wireless communication device 30 according to an embodiment of the present invention. The wireless communication device 30 is used in an electronic device such as a computer system, a mobile device, etc, and includes the wireless communication module WR_mod_1, the wireless communication module WR_mod_2, an RF front-end circuit 300, the antenna ANT_1, the antenna ANT_2, a first control unit 310 and a second control unit 320. The RF front-end circuit 300 adjusts the couplings between the wireless communication modules WR_mod_1 and WR_mod_2, and the antennas ANT_1 and ANT_2, according to control signals CTR1 and CTR2. The first control unit 310 generates the control signal CTR1 according to the operation conditions of the wireless communication modules WR_mod_1 and WR_mod_2. The second control unit 320 generates the control signal CTR2 according to the priorities of the wireless signals, and the channel qualities corresponding to the antennas ANT_1 and ANT_2. The RF front-end circuit 300, the first control unit 310 and the second control unit 320 can be integrated as a RF processing circuit to realize the present invention.

As can be seen from the above, the wireless communication device 30 is similar to the wireless communication device 10 shown in FIG. 1, except that the second control unit 320 is added in the wireless communication device 30. The second control unit 320 is used for controlling the RF front-end circuit 300 to transmit and receive the wireless signal with the higher priority via the antenna with the better channel quality such that the wireless signal is highly possible to be recovered correctly. Preferably, a priority of a wireless signal is determined by a user input or by a configuration predefined in the wireless communication device 30. Further, the priority may depend on user's preference or an amount of control information included in the wireless signal, but is not limited herein. In other words, the wireless communication device 30 is similar to the wireless communication device 10 in that when the operation frequency bands used by the wireless communication modules WR_mod_1 and WR_mod_2 are different or the wireless communication module WR_mod_1 stops operation, the wireless communication module WR_mod_2 can use the MIMO technique. Further, the wireless communication device 30 takes priorities of the wireless signals transmitted and received by the wireless communication modules WR_mod_1 and WR_mod_2 and the channel qualities corresponding to the antennas ANT_1 and ANT_2 into consideration for deciding how to arrange the antennas ANT_1 and ANT_2. The channel qualities corresponding to the antennas ANT_1 and ANT_2 can be measured by the wireless communication device 30, or be fed back by the wireless communication systems corresponding to the wireless communication modules WR_mod_1 and WR_mod_2, and is not limited herein. Besides, the first control unit 310 and the second control unit 320 can be integrated as a single control unit for a low cost.

Therefore, the RF front-end circuit 300 needs to adjust transmission paths of the wireless signals in two steps. For example, please refer to FIG. 4, which is a schematic diagram of an RF front-end circuit 40 according to an embodiment of the present invention, to realize the RF front-end circuit 300 shown in FIG. 3. The RF front-end circuit 40 includes a first switch 402, a second switch 404, a diplexer 406 and an interface 408. Comparing FIG. 2 and FIG. 4, the RF front-end circuit 40 is similar to that of the RF front-end circuit 20, except that the second switch 404 is added in the RF front-end circuit 40. In short, the first switch 402 is used for adjusting couplings between terminals P1$a$ and P2$a$, and terminals P3$a$ and P4$a$ according to the control signal CTR1. The diplexer 406 includes three signal terminals: S1$a$, S2$a$ and S3$a$. The diplexer 406 is used for combining wireless signals on different operation frequency bands received respectively at the signal terminals S1$a$ and S2$a$, and transferring a combined wireless signal to the second switch 404 via the signal terminal S3$a$. Alternatively, the diplexer 406 is used for separating the combined wireless signal received at the signal terminal S3$a$ via the second switch 404 into the wireless signals on the different operation frequency bands, and transferring respectively the wireless signals on the different operation frequency bands to the signal terminals S1$a$ and S2$a$. The interface 408 is coupled between the wireless communication module WR_mod_2 and the second switch 404, for providing a transmission path for wireless signals, e.g., the wireless signal WR3_FB1 and WR3_FB2. Preferably, the second switch 404 is realized by a DPDT switch with low complexity which provides a parallel coupling and a cross coupling for adjusting couplings between terminals P1$a$ and P2$a$, and terminals P3$a$ and P4$a$ according to the control signal CTR2. Please note that, any switch capable of adjusting the transmission paths of the wireless signals can be used for realizing the second switch 404, and is not limited herein.

Figure 4:
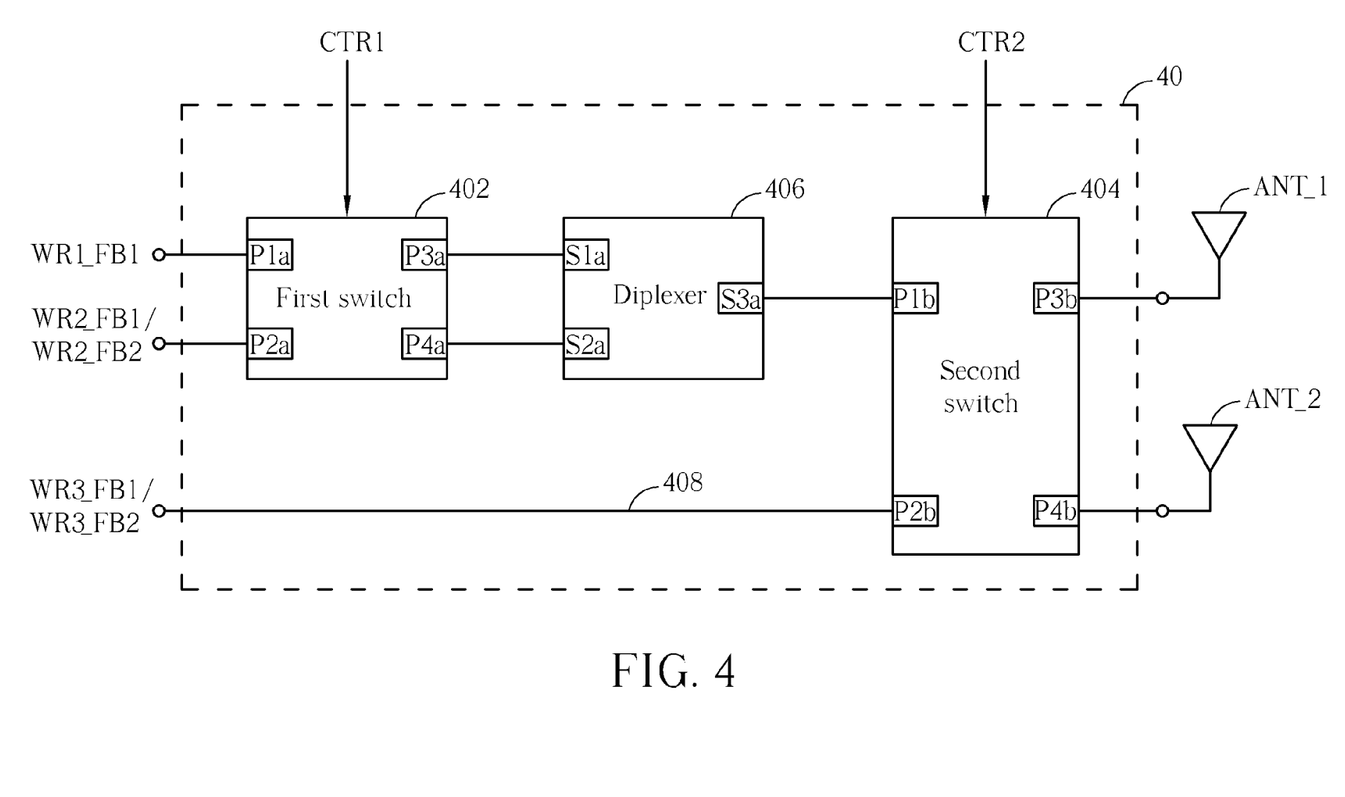
FIG. 4 is a schematic diagram of an embodiment of the RF front-end circuit shown in FIG. 3.

In FIG. 4, the control signal CTR2 is generated according to the channel qualities corresponding to the antennas ANT_1 and ANT_2 and the priorities of the wireless signals transmitted and received by the wireless communication modules WR_mod_1 and WR_mod_2. More specifically, the priorities of the wireless signals transmitted and received by the wireless communication modules WR_mod_1 and WR_mod_2 are priorities of wireless signals transmitted and received by the signal terminal S3$a$ and the interface 408.

In other words, if the channel quality corresponding to the antenna ANT_1 is better and a priority of the wireless signal transmitted and received by the signal terminal S3$a$ is higher, the second switch 404 connects the terminals P1$b$ and P2$b$ to the terminals P3$b$ and P4$b$, respectively (i.e., the parallel coupling) to obtain the antenna diversity, according to the control signal CTR2. Otherwise, if a priority of the wireless signal transmitted and received by the interface 408 is higher, the second switch 404 connects the terminals P1$b$ and P2$b$ to the terminals P4$b$ and P3$b$, respectively (i.e., the cross coupling) to obtain the antenna diversity, according to the control signal CTR2. Therefore, after the second switch 404 is added in the RF front-end circuit 40, not only the wireless communication module WR_mod_2 can use the MIMO technique, but the wireless communication modules WR_mod_1 and WR_mod_2 can obtain the antenna diversity by properly adjusting the second switch 404.

In above examples, whether in the RF front-end circuit 20 or the RF front-end circuit 40, the wireless communication module WR_mod_2 can use the MIMO technique to transmit and receive the wireless signals in the high data rate, when the operation frequency bands used by the wireless communication modules WR_mod_1 and WR_mod_2 are different or the wireless communication module WR_mod_1 stops operation. Furthermore, the channel qualities corresponding to the antennas ANT_1 and ANT_2 and the priorities of the wireless signals transmitted and received by the wireless communication modules WR_mod_1 and WR_mod_2 are considered in the RF front-end circuit 40 such that the wireless communication modules WR_mod_1 and WR_mod_2 can obtain the antenna diversity.

Besides, the wireless communication modules WR_mod_1 and WR_mod_2 refer to modules (e.g. wireless network access devices, wireless routers, wireless adaptors, etc.) for processing respective different wireless communication systems, e.g., Bluetooth and Wi-Fi, and are not limited herein.

In conclusion, a wireless communication module can use a MIMO technique to transmit and receive wireless signals in a high data rate by using a RF front-end circuit, when operation frequency bands used by wireless communication modules are different. Further, transmissions of wireless signals are determined according to priorities of the wireless signals, and channel qualities corresponding to antennas transmitting the wireless signals, to increasing a probability of correctly recovering a wireless signal with a higher priority.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) processing circuit used in a wireless communication device, comprising:
    an RF front-end circuit, coupled to a first antenna, a second antenna, a first wireless communication module and a second wireless communication module, for switching couplings between the first antenna and the second antenna, and the first wireless communication module and the second wireless communication module according to a control signal; and
    a control unit, for generating the control signal to the RF front-end circuit according to operation frequency bands and operation conditions of the first wireless communication module and the second wireless communication module;
    wherein the first wireless communication module and the second wireless communication module are coupled to the first antenna simultaneously and the second wireless communication module is also coupled to the second antenna according to the control signal generated by the control unit, when the operation frequency bands of the first wireless communication module and the second wireless communication module are different, or when the first wireless communication module stops operation.

2. The RF processing circuit of claim 1, wherein the RF front-end circuit comprises:
    an interface, for coupling the second antenna and the second wireless communication module;
    a diplexer, comprising a first signal terminal and a second signal terminal respectively used for different operation frequency bands, and a third signal terminal coupled to the first antenna, for exchanging signals between the first signal terminal and the second signal terminal, and the third signal terminal; and
    a first switch, comprising a first terminal coupled to the first wireless communication module, a second terminal coupled to the second wireless communication module, a third terminal coupled to the first signal terminal, and a fourth terminal coupled to the second signal terminal, for switching couplings between the first terminal and the second terminal, and the third terminal and the fourth terminal according to the control signal.

3. The RF processing circuit of claim 2, wherein the control unit controls the first switch via the control signal to turn on a coupling between the first terminal and the third terminal, and a coupling between the second terminal and the fourth terminal, when the operation frequency bands of the first wireless communication module and the second wireless communication module are different.

4. The RF processing circuit of claim 2, wherein the control unit controls the first switch via the control signal to turn on a coupling between the first terminal and the third terminal, and a coupling between the second terminal and the fourth terminal, when the operation frequency bands of the first wireless communication module and the second wireless communication module are the same and the first wireless communication module is operating.

5. The RF processing circuit of claim 2, wherein the control unit controls the first switch via the control signal to turn on a coupling between the first terminal and the fourth terminal, and a coupling between the second terminal and the third terminal, when the operation frequency bands of the first wireless communication module and the second wireless communication module are the same and the first wireless communication module stops operation.

6. The RF processing circuit of claim 2, wherein the first switch is a dual-pole dual-throw (DPDT) switch.

7. The RF processing circuit of claim 2, wherein the RF front-end circuit further comprises a second switch, comprising a first terminal coupled to the third signal terminal of the diplexer, a second terminal coupled to the interface, a third terminal coupled to the first antenna, and a fourth terminal coupled to the second antenna, for switching couplings between the first terminal and the second terminal, and the third terminal and the fourth terminal according to the control signal.

8. The RF processing circuit of claim 7, wherein the control unit generates the control signal to the second switch according to priorities of signals transmitted by the first terminal and the second terminal of the second switch, and channel qualities corresponding to the first antenna and the second antenna.

9. The RF processing circuit of claim 8, wherein the priorities of the signals transmitted by the first terminal and the second terminal of the second switch are determined by a user input.

10. The RF processing circuit of claim 8, wherein the priorities of the signals transmitted by the first terminal and the second terminal of the second switch are predefined in the wireless communication device.

11. The RF processing circuit of claim 8, wherein the channel qualities corresponding to the first antenna and the second antenna are measured by the wireless communication device.

12. The RF processing circuit of claim 8, wherein the channel qualities corresponding to the first antenna and the second antenna are fed back by wireless networks corresponding to the first wireless communication module and the second wireless communication module.

13. A wireless communication device, comprising:
a first antenna;
a second antenna;
a first wireless communication module;
a second wireless communication module; and
a radio-frequency (RF) processing circuit, comprising:
an RF front-end circuit, coupled to the first antenna, the second antenna, the first wireless communication module and the second wireless communication module, for switching couplings between the first antenna and the second antenna, and the first wireless communication module and the second wireless communication module according to a control signal; and
a control unit, for generating the control signal to the RF front-end circuit according to operation frequency bands and operation conditions of the first wireless communication module and the second wireless communication module;
wherein the first wireless communication module and the second wireless communication module are coupled to the first antenna simultaneously and the second wireless communication module is also coupled to the second antenna according to the control signal generated by the control unit, when the operation frequency bands of the first wireless communication module and the second wireless communication module are different, or when the first wireless communication module stops operation.

14. The wireless communication device of claim 13, wherein the RF front-end circuit comprises:
an interface, for coupling the second antenna and the second wireless communication module;
a diplexer, comprising a first signal terminal and a second signal terminal respectively used for different operation frequency bands, and a third signal terminal coupled to the first antenna, for exchanging signals between the first signal terminal and the second signal terminal, and the third signal terminal; and
a first switch, comprising a first terminal coupled to the first wireless communication module, a second terminal coupled to the second wireless communication module, a third terminal coupled to the first signal terminal, and a fourth terminal coupled to the second signal terminal, for switching couplings between the first terminal and the second terminal, and the third terminal and the fourth terminal according to the control signal.

15. The wireless communication device of claim 14, wherein the control unit controls the first switch via the control signal to turn on a coupling between the first terminal and the third terminal, and a coupling between the second terminal and the fourth terminal, when the operation frequency bands of the first wireless communication module and the second wireless communication module are different.

16. The wireless communication device of claim 14, wherein the control unit controls the first switch via the control signal to turn on a coupling between the first terminal and the third terminal, and a coupling between the second terminal and the fourth terminal, when the operation frequency bands of the first wireless communication module and the second wireless communication module are the same and the first wireless communication module is operating.

17. The wireless communication device of claim 14, wherein the control unit controls the first switch via the control signal to turn on a coupling between the first terminal and the fourth terminal, and a coupling between the second terminal and the third terminal, when the operation frequency bands of the first wireless communication module and the second wireless communication module are the same and the first wireless communication module stops operation.

18. The wireless communication device of claim 14, wherein the first switch is a dual-pole dual-throw (DPDT) switch.

19. The wireless communication device of claim 14, wherein the RF front-end circuit further comprises a second switch, comprising a first terminal coupled to the third signal terminal of the diplexer, a second terminal coupled to the interface, a third terminal coupled to the first antenna, and a fourth terminal coupled to the second antenna, for switching couplings between the first terminal and the second terminal, and the third terminal and the fourth terminal according to the control signal.

20. The wireless communication device of claim 19, wherein the control unit generates the control signal to the second switch according to priorities of signals transmitted by the first terminal and the second terminal of the second switch, and channel qualities corresponding to the first antenna and the second antenna.

21. The wireless communication device of claim 20, wherein the priorities of the signals transmitted by the first terminal and the second terminal of the second switch are determined by a user input.

22. The wireless communication device of claim 20, wherein the priorities of the signals transmitted by the first terminal and the second terminal of the second switch are predefined in the wireless communication device.

23. The wireless communication device of claim 20, wherein the channel qualities corresponding to the first antenna and the second antenna are measured by the wireless communication device.

24. The wireless communication device of claim 20, wherein the channel qualities corresponding to the first antenna and the second antenna are fed back by wireless networks corresponding to the first wireless communication module and the second wireless communication module.

* * * * *